United States Patent

[11] 3,610,403

| [72] | Inventors | Gerald L. Schoen;<br>Robert W. Smith, both of Kaukauna, Wis. |
|---|---|---|
| [21] | Appl. No. | 808,210 |
| [22] | Filed | Mar. 18, 1969 |
| [45] | Patented | Oct. 5, 1971 |
| [73] | Assignee | Badger Northland Inc.<br>Kaukauna, Wis. |

[54] MATERIAL DISTRIBUTION APPARATUS
3 Claims, 7 Drawing Figs.

[52] U.S. Cl. .................................................. 198/101,
214/16
[51] Int. Cl. ...................................................... B65g 47/44,
B65g 23/00
[50] Field of Search ............................................. 198/110,
111, 126, 101; 214/18.34, 16, 26; 119/52

[56] References Cited
UNITED STATES PATENTS
2,649,978  8/1953  Smith ............................ 214/26

| 1,891,687 | 12/1932 | Norman .......................... | 198/126 |
| 2,805,666 | 9/1957 | Schlossmacher .............. | 198/126 X |
| 3,428,027 | 2/1969 | Haen et al. .................... | 119/52 |

*Primary Examiner*—Gerald M. Forlenza
*Assistant Examiner*—Robert J. Spar
*Attorney*—Gerhardt, Greenlee & Farris ABSTRACT: A material distribution apparatus for receiving material from a material supply and distributing it evenly over an elongated area. The material distributor has a carriage assembly with an endless conveyor mounted on a track above the elongated area. The endless conveyor is held at one point adjacent to the material supply point so that when the carriage is reciprocated back and forth on the track, the material will be carried off the end of the moving carriage by the endless conveyor. The carriage is propelled by a stationary power source which is mechanically connected to the carriage assembly.

PATENTED OCT 5 1971

INVENTORS.
GERALD L. SCHOEN
BY ROBERT W. SMITH

Twedale & Gerhardt
ATTORNEYS

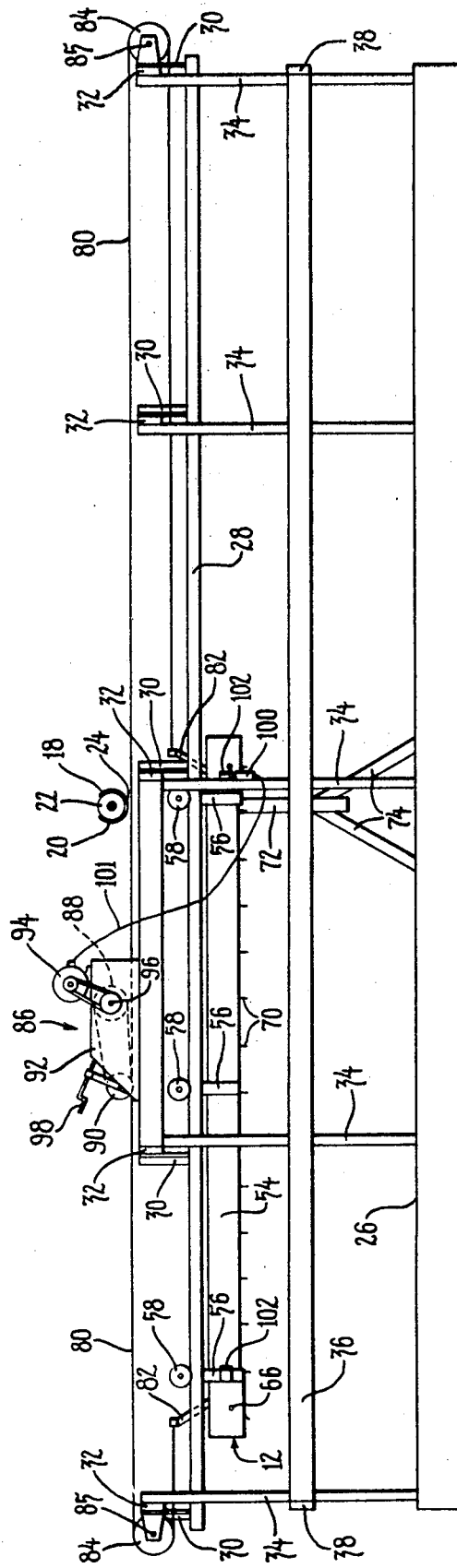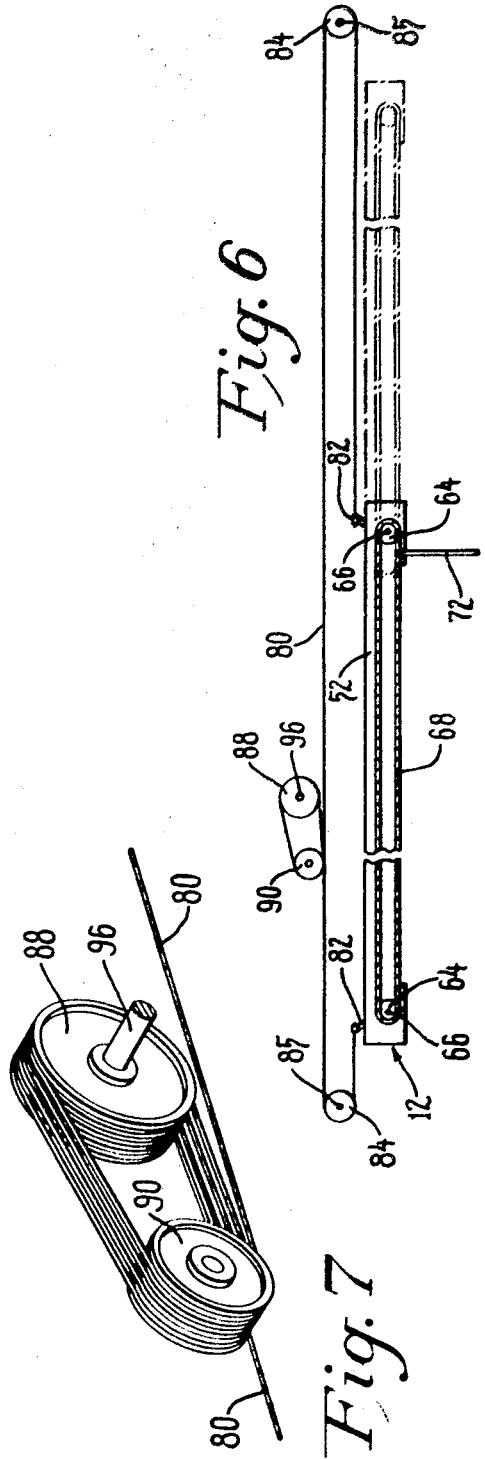

MATERIAL DISTRIBUTION APPARATUS

This invention is related to an improved material distributor. More specifically, the invention is related to a material distributor for distributing feed for livestock in a feed bunk.

Self-propelled material distributors for livestock, as shown by our U.S. Pat. No. 3,428,027, are presently in use. These feeders have a carriage mounted on a track above a feed bunk. The carriage, which is approximately half the length of the feed bunk, supports an endless conveyor. Livestock feed is deposited on the endless conveyor at a point above the approximate center of the feed bunk. One portion of the endless conveyor is held against movement at a point adjacent to the central material delivery point. A motor mounted on the carriage drives the conveyor relative to the carriage. Since one portion of the endless conveyor is held against movement, driving the endless conveyor relative to the carriage propels the carriage along the track and results in the material, deposited on the endless conveyor below the central delivery point, being carried off the end of the carriage and evenly distributed along the feed bunk. The motor mounted on the carriage is normally reversed when the carriage nears each end of the feed bunk so that livestock feed is evenly distributed on both ends of the feed bunk. The motor receives power through a flexible cord which attaches the motor on the moveable carriage to a stationary power source.

An object of this invention is to provide an improved material distributor which has a simplified design, requires a minimum of maintenance, and is inexpensive to operate.

Another object of this invention is to provide an improved material distributor which is not connected to an electrical power source by a flexible cord and is, therefore, less likely to cause injury to an operator or to livestock.

Accordingly, the material distribution apparatus of this invention for continuously distributing bulk material from a relatively fixed continuous flow central delivery point outwardly from said point over an elongated area comprises a longitudinal track extending over substantially the length of the elongated area, a carriage assembly, and suspension means supporting the carriage assembly on the track for movement along the length of the track. A pair of spaced rotatable members are carried by the carriage assembly and an endless conveyor is entrained around them. A portion of the endless conveyor is held by a stationary member at a point adjacent to the central delivery point. A drive means is connected to the carriage assembly to propel the carriage assembly back and forth over the elongated area. As the carriage assembly is propelled back and forth, the conveyor, which is held at one point, moves relative to the carriage assembly and discharges bulk material over the elongated area. The bulk material is continuously deposited on the endless conveyor carried by the carriage assembly at a point near the center of the elongated area and above the carriage.

The invention will be more clearly understood by reference to the following detailed description, the appended claims, and the drawing.

In the drawing:

FIG. 5 is a side elevation of the material distributor of this invention employing an alternate carriage assembly drive.

FIG. 6 is a schematic representation showing the reciprocating path of travel of the carriage assembly employing the alternate drive of FIG. 5.

FIG. 7 is a perspective view of a portion of the alternate drive of FIG. 5.

Figure 1:
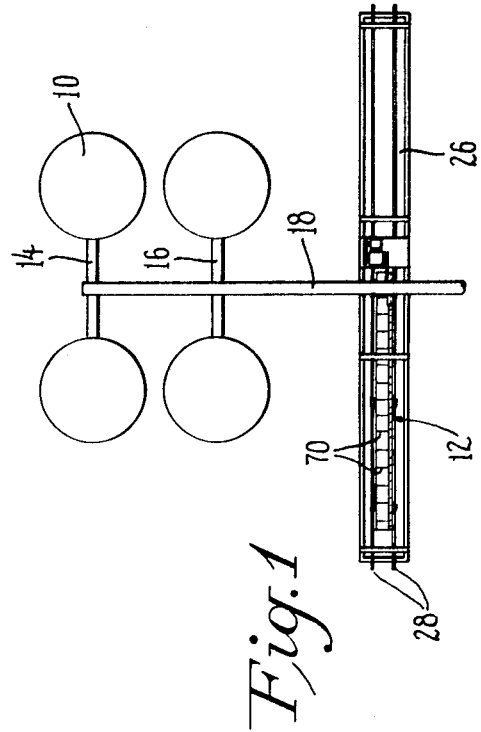
FIG. 1 is a schematic representation of a barnyard installation employing the material distributor of the invention.
Figure 3:
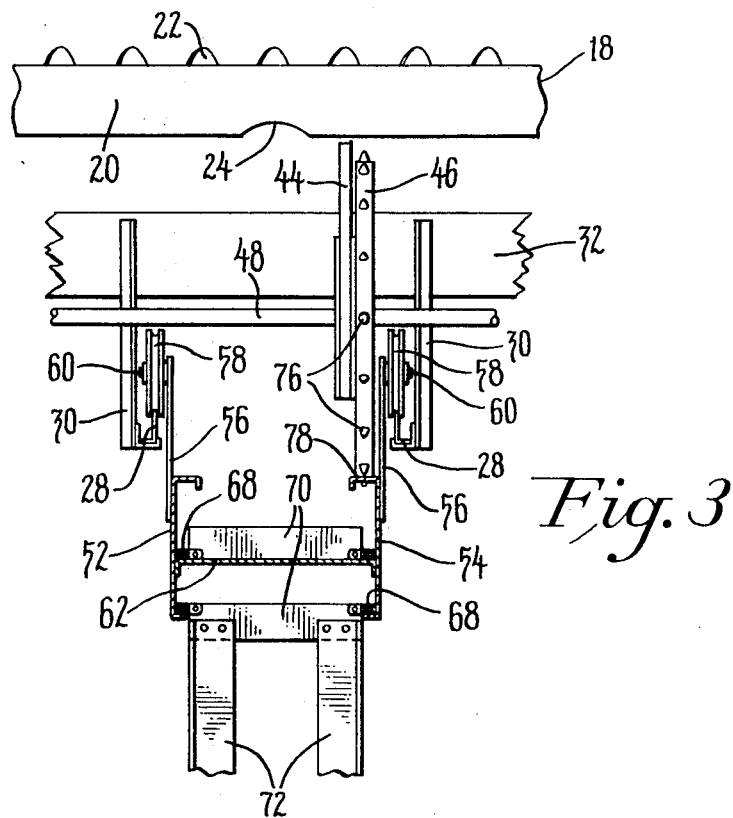
FIG. 3 is a sectional view taken along line 3—3 in FIG. 1 illustrating the endless conveyor and the carriage assembly drive means.

FIG. 1 shows an installation including four silos 10 and employing the material distributor 12 of this invention. Bulk material such as livestock feed is conveyed from the silos 10 by the conveyors 14 and 16 and discharged into a main conveyor 18. As best shown in FIG. 3, the conveyor 18 includes a conveyor housing 20, an auger 22 which rotates and conveys material through the housing, and an opening 24. During operation, material is continuously discharged through the opening 24 and falls onto the material distributor 12. While only one material distributor 12 is shown in FIG. 1, it is contemplated that the conveyor 18 could be extended to one or more additional material distributors and that covers could be placed over the openings 24 to control the flow of material to the material distributors.

Figure 2:
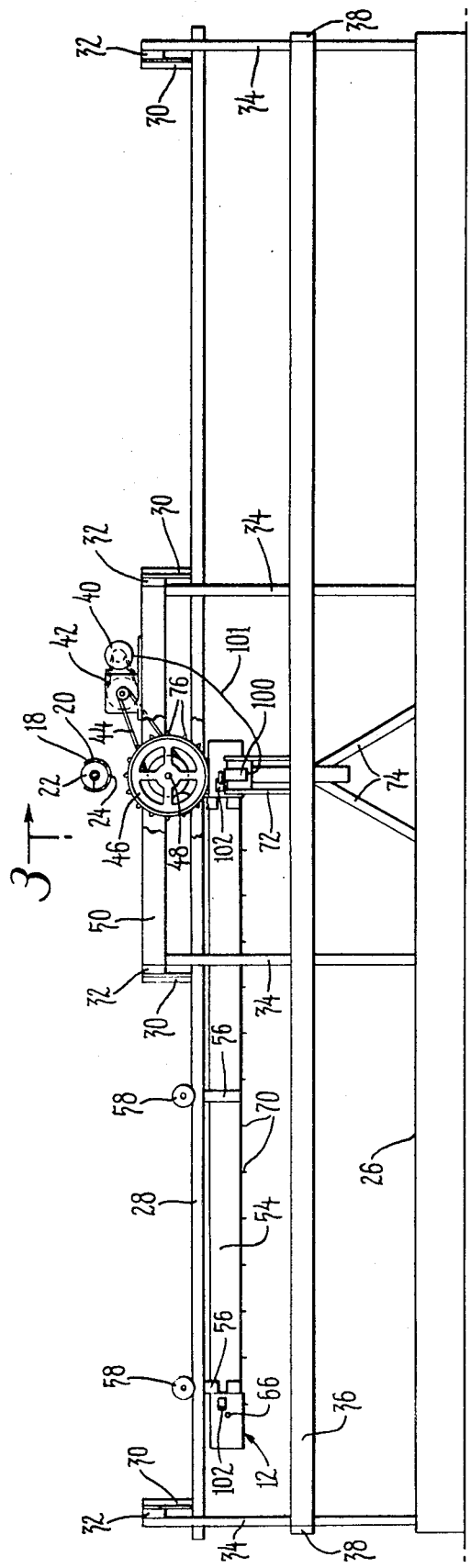
FIG. 2 is a side elevation of the material distributor of this invention.

The conveyor 18 extends over the top of an elongated area, such as the feed bunk 26, and deposits material on the material distributor 12 at approximately the midpoint of the elongated area as shown in FIGS. 1, 2, and 5. By having the opening 24 in the conveyor 18 at approximately the center of the feed bunk 26, a material distributor 12 about half the length of the feed bunk can evenly distribute material the whole length of the bunk.

The material distributor 12 is supported above the elongated area or feed bunk 26 on a track with parallel rails 28. The rails 28 are supported by hangers 30 attached to cross-members 32 on the vertical supports 34. Suitable braces 36 and 38 are provided to hold the vertical supports 34 in proper alignment.

A drive with a reversible motor 40, a gearbox 42, a belt 44, and a final drive pinion 46 on a shaft 48 are mounted on frame members 50. The frame members 50 are attached to the top of the vertical supports 34 above the parallel rails 28. The motor 40 is connected to a suitable power source (not shown). Since the motor 40 is mounted on the stationary frame member 50, the wires connecting the motor 40 to a suitable power source can be placed so as to be protected from the operator and livestock.

Figure 4:
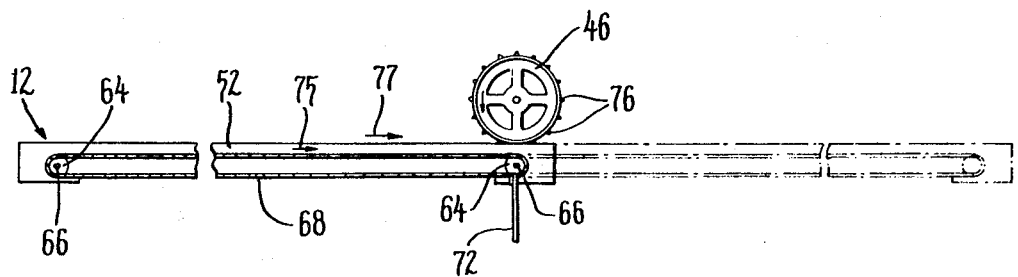
FIG. 4 is a schematic representation showing the reciprocating path of travel of the carriage.

The material distributor 12 has a carriage assembly with elongated frame members 52 and 54. A series of brackets 56 are attached to each of the frame members 52 and 54. A wheel 58 is rotatably attached to the top of each bracket 56 by a shaft 60. These wheels 58 support the material distributor above the feed bunk between the rails 28. As shown in the drawings, the material distributor 12 is supported below the rails 28. However, by changing the brackets 56, the material distributor 12 could be supported at the same height as the rails 28 or above the rails 28. A cross brace 62 is connected between the elongated frame members 52 and 54. Rotatable members 64 as best shown in FIGS. 4 and 6 are supported near each end of the elongated frame members 52 and 54, on shafts 66 journalled in the elongated frame members. An endless conveyor is entrained around the rotatable members 64. As shown in the drawings, the endless conveyor consists of a pair of parallel endless chains 68 entrained around the rotatable members 64. A plurality of flights 70 are connected between each of the two endless chains 68 to convey the material deposited on the cross brace 62 by the conveyor 18 to one end or the other of the material distributor 12 where it drops to the feed bunk 26 below. The endless conveyor entrained around rotatable members 64 could also be an endless belt. If the conveyor were an endless belt rather than endless chains 68 and flights 70, the rotatable members 64 would be drums rather than sprockets and the cross brace 62 would not have to be a solid pan to support material.

The endless conveyor of the material distributor 12 is driven relative to the carriage assembly elongated frame members 52 and 54 by holding one point on the lower run of the endless conveyor against movement. This is done by attaching one of the flights 70 to stationary members 72. The stationary members 72 are attached, by support members 74, to the bunk 26 directly under the opening 24 in the conveyor 18. By moving the carriage assembly of the material distributor 12 in one direction or the other, the upper run of the endless conveyor conveys material in the same direction as the carriage assembly moves as indicated by the arrows 75 and 77 in FIG. 4. The upper run of the endless conveyor will move as fast relative to the elongated frame members 52 and 54 as the frame will move relative to the feed bunk 26 giving the upper run of the endless conveyor a velocity twice that of the elongated frame members 52 and 54 relative to the stationary feed bunk. The arrow 75 indicates the direction and velocity of the carriage assembly and the arrow 77 indicates the direction and velocity of the upper run of the endless conveyor when the drive pinion 46 is turned counterclockwise as indicated by the arrow in FIG. 4. The elongated frame members 52 and 54 of the material distributor 12 are reciprocated back and forth on the rails by the motor 40 and its drive train. The final drive pinion 46 of the drive train has teeth 76 which mesh with a rack 78 formed by placing holes in elongated frame member 54 as shown in FIG. 3.

FIGS. 5 and 6 show an alternate drive for propelling the material distributor 12 back and forth on the rails 28. With this drive, the carriage assembly is reciprocated back and forth by a cable 80 attached to brackets 82 on each end of the elongated frame members 52 and 54. The cable 80 runs from one bracket 82 to one of the two pulleys 84, to the cable drive 86, to the other pulley 84 and back to the second bracket 82. The pulleys 84 are rotatably supported on shafts 85. One of the pulleys 84 is above one end of the feed bunk 26 and the other pulley 84 is above the other end of the feed bunk 26. The cable drive 86 has a pair of drums 88 and 90 rotatably supported by frame members 92. The drum 88 on shaft 96 is driven by reversible motor 94. The cable 80 is wrapped around the drums 88 and 90 a number of times as shown in FIG. 7 to prevent slippage of the cable 80 relative to the drum 88. The tension in the cable 80 is adjusted by turning crank 98 which moves the drum 90 to change the distance between the drums 88 and 90.

The direction of movement of the material distributor 12 is controlled by a limit switch 100 mounted to one side of the path of the carriage assembly and near the center of the feed bunk. The limit switch 100 is connected to the reversible motor 40 or 94 by wires 101. A stop member 102 is placed near each end of the elongated frame member 54 to contact the limit switch 100 when the carriage reaches the end of the feed bunk and reverse the reversible motor 40 or 94 to change the direction of movement of the carriage assembly.

During the operation of the material distributor 12, the carriage assembly, with elongated frame members 52 and 54 and an endless conveyor mounted between the elongated frame members, is reciprocated back and forth on rails 28. While the material distributor 12 is reciprocated back and forth, a conveyor 18 supplies material continuously to the upper run of the endless conveyor. Since the bottom run of the endless conveyor is attached to a stationary member 72 at a point under the opening 24 in the conveyor 18, the top run of the endless conveyor travels at a rate twice that of the carriage assembly and distributes material from the conveyor 18 evenly on the feed bunk 26. When the material distributor nears one end of the feed bunk, one of the stop members 102 contacts an arm on the limit switch 100 reversing the direction of the reversible motor 40 or 94 and thereby reversing the direction of the material distributor 12. The material distributor 12 continues to receive material and convey it off the leading end of the carriage assembly until the drive motor 40 or 94 is turned off.

We claim:

1. Material distribution apparatus for continuously distributing bulk material from a relatively fixed continuous flow central delivery point outwardly from said point over an elongated area, comprising a longitudinal track extending over substantially the length of said elongated area, a carriage assembly, said carriage assembly including a pair of elongated frame members which form sides for the carriage assembly and suspension means supporting said carriage assembly from said track for free movement along the length of the track, a pair of spaced support members carried by said elongated frame members of the carriage assembly, an endless conveyor including a lower and an upper run entrained around said support members, and between said elongated frame members, stationary means adjacent to the central delivery point for holding one portion of said endless conveyor against movement relative to said central delivery point, reversible drive means including a flange on at least one of said elongated frame members constituting a rack extending substantially the length of the carriage assembly and a pinion gear adjacent to the central delivery point within the lateral confines of the carriage assembly and in engagement with the rack for positively moving the carriage assembly back and forth over said elongated area, said endless conveyor moving relative to said carriage assembly to discharge bulk material there from when the carriage assembly is moved back and forth, and material supply means located substantially near the center of the elongated area and above said carriage assembly for continuously depositing bulk material on said endless conveyor at said central delivery point.

2. The material distribution apparatus of claim 1 wherein the stationary means adjacent to the central delivery point for holding one portion of said endless conveyor holds a portion of the lower run of the endless conveyor.

3. Material distribution apparatus for continuously distributing bulk material from a relatively fixed continuous flow central delivery point outwardly from said point over an elongated area, comprising a longitudinal track extending over substantially the length of said elongated area, a carriage assembly, said carriage assembly including a pair of elongated frame members, which form sides for the carriage assembly and suspension means supporting said carriage assembly from said track for free movement along the length of the track, a pair of spaced rotatable members carried by said carriage assembly, an endless conveyor having an upper and a lower run entrained around said rotatable members and between said elongated frame members, stationary means for holding one portion of the lower run of said endless conveyor against movement relative to said central delivery point, a reversible stationary power source, drive means including a flange on at least one of said elongated frame members constituting a rack extending substantially the length of the carriage assembly and a pinion gear driven by said stationary source and located adjacent to the central delivery point within the lateral confines of the carriage assembly and in engagement with the rack for positively moving the carriage assembly back and forth over said elongated area and thereby driving said endless conveyor relative to said carriage assembly to discharge bulk material there from when the carriage assembly is moved back and forth, and material supply means located substantially near the center of the elongated area and above said carriage assembly for continuously depositing bulk material on said endless conveyor at said central delivery point.